Dec. 29, 1936. G. E. SWARTZ 2,066,167

SHAFT OPERATING AND LOCKING DEVICE

Filed July 18, 1932

INVENTOR
G. E. Swartz
C. F. Heinkel
ATTORNEY

Patented Dec. 29, 1936

2,066,167

UNITED STATES PATENT OFFICE 2,066,167

SHAFT OPERATING AND LOCKING DEVICE

Guy E. Swartz, Detroit, Mich.

Application July 18, 1932, Serial No. 623,229

11 Claims. (Cl. 192—8)

My invention relates to means for rotatively moving shaft-like elements and for releasably locking the same against reverse rotation.

In many and various devices it is quite desirable and, in fact, necessary that shafts or the like be rotated, or a part of a structure be moved, and rotation or movement be stopped at a certain stage of the rotation or movement and the shaft or structure be locked automatically at the end of the rotation or movement.

Various devices have been made to rotate and lock shafts, each performing its function in its own way and with its own structure but all have some disadvantages and none attains the usefulness desired although they are extensively used because there was nothing better at hand.

In the present invention, the disadvantages found in the prior art are eliminated and replaced by desirable advantages.

The objects of my invention are a simple operating and locking means for shafts and the like; which is easy of operation; which locks automatically under all conditions; which does not wear appreciably to destroy the locking feature thereof; and which can be released easily.

Other objects will appear in this specification or become obvious or apparent therein and in the accompanying drawing.

I attain my objects by the mechanism illustratively shown in the accompanying drawing, in which.

Similar reference characters refer to similar parts throughout the views.

Figure 1:
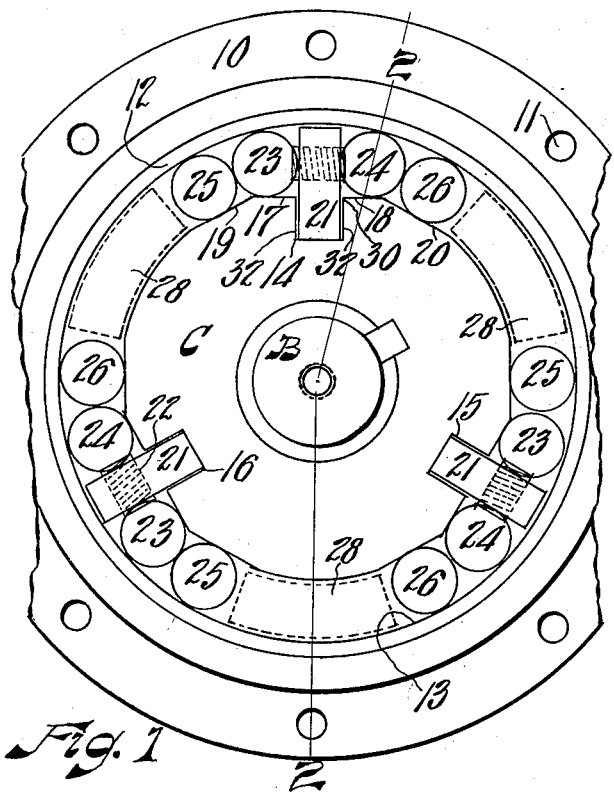
Fig. 1 is a side view of a driving locking device embodying my invention; the cover or end plate being removed to show the interior relation of parts more clearly.
Figure 2:
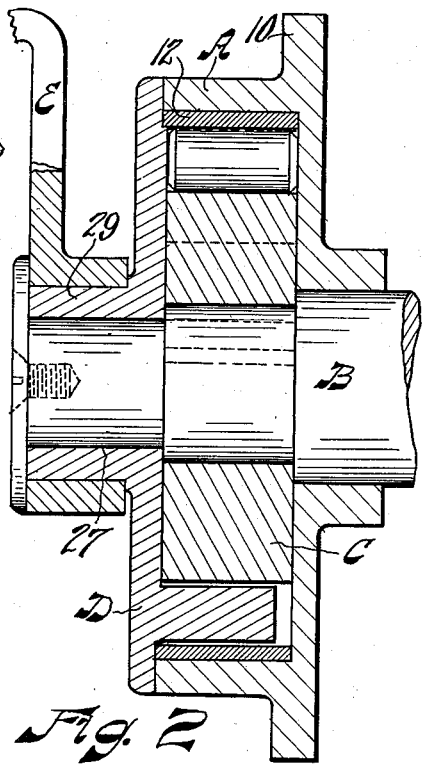
Fig. 2 is a section taken on line 2—2 of Fig. 1 also showing interior relations of parts more clearly.
Figure 3:
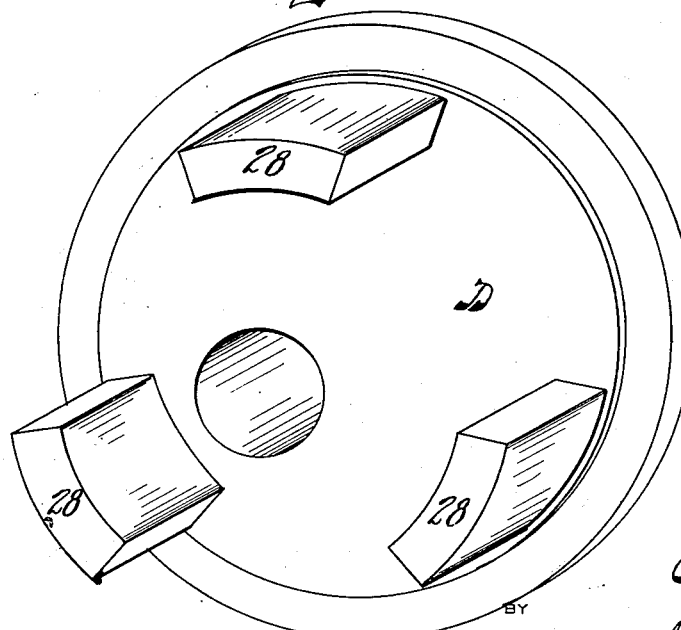
Fig. 3 is a perspective view of the cover or end plate or driving member and prongs thereon.
Figure 4:
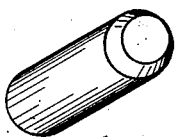
Fig. 4 is a perspective view of one of the rollers with ends beveled for easy assembling of the device.
Figure 5:
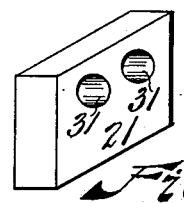
Fig. 5 is a perspective view of a contact member with the holes for the springs thereon.

The device shown in the accompanying drawing for illustration purposes comprises as follows:

The casing A is shown as having the flange 10 and the holes 11 therethrough for attachment to a device in which a rotating and locking means is desirable or necessary. When desired, the casing can be made integral with a device although I prefer, for commercial reasons, to make the rotating and locking device separate so that the same can be attached to and removed from a structure without disturbing other parts thereof and the device can be made in quantities to reduce the cost thereof.

For longer life of the device, I prefer to line the casing with the hardened and ground bushing 12 although the casing itself may be hardened and ground where necessary to eliminate the bushing.

The shaft B extends through the device concentric with the bore 13 in the casing and may conveniently be a part of a structure to which the device is attached.

The driven member C is keyed onto the shaft B and is located within the bore 13. In the present instance, the driven member C has three slots 14 across the face thereof equally spaced from each other. Adjacent to the slots are the flat faces 17 and 18 and adjacent to the faces 17 and 18 are the flat faces 19 and 20 as shown.

These faces 17, 18, 19, and 20 are inclined relative to each other or in different planes and each forms the bottom of a recess in the periphery of the driven member, each of which bottoms is closer to the bore at its end most remote from the below described contact member.

The contact members 21 are located in the respective slots 14, 15 and 16, extend radially close to the bore 13, and each may have the springs 22 therein.

Each of the contact members 21 may fit closely to the sides of the corresponding slot in some instances but mostly there is to be some clearance therebetween irrespective of whether or not the springs 22 are used. The springs 22 are more or less of a convenience rather than an absolute necessity. They have a cushioning effect on the driving and locking and in that respect are an advantage in that the locking members are not normally held against the contact members but do abut the springs and do abut on the contact members after the pressure of the driving member is great enough to compress the springs to within one side of the contact members.

The rollers or motion transmitting members 23 and 24 are located at the respective sides of the contact members and between the bore 13 and the flat faces 17 and 18 respectively. The rollers or motion transmitting members 25 and 26 are located at the respective sides of the rollers 23 and 24 and between the bore 13 and the flat faces 19 and 20 respectively as shown.

The driving member D is centralized in the bore 13, is journaled on the shaft B at 27, and closes the otherwise open end of the cup shaped member or casing A.

The prongs 28, three in number in this instance, extend from the driving member D inwardly of the device and reach in between the rollers 25 and 26 respectively of each two of the driving locking mechanisms as indicated in dotted lines in Fig. 1.

The operating handle E is held onto the polygonal part 29 of the member D to rotate the member D and thereby, through the prongs, operate or move the rollers and the contact members 21 and the driven member C and the shaft B.

The arrangement of two or paired rollers sidewise adjacent to each other is quite important in that additional friction over one roller friction locking is attained or produced independent of the action by the operating handle E. The paired rollers contact each other for locking and also contact the corresponding flat faces and also contact the bore in the casing when the device is very accurately made. However, in the present instance, no such accuracy is necessary since each companion roller or roller of each pair needs not contact the corresponding flat face. One roller of each pair may contact its companion roller and the contact member and the casing but be free of contact on the corresponding flat face while its companion roller may contact the corresponding flat face and the bore in addition to its contact on the one roller. Thus, when the shaft and the contact member tend to reverse, the last roller is wedged in the less deep part of the corresponding recess between the corresponding face and the bore; the other roller may and can wedge itself either between its corresponding flat face and the firstly mentioned roller or between the bore and the firstly mentioned roller and be free of contact on the corresponding flat face. During this tendency to reverse, if there is any motion at all, the rollers each rotate reversely between themselves and also reversely relative to their contact on the driven member and in the bore during their positional movement while each roller is rotatable or can rotate on its own axis. This produces a better lock due to the additional frictional contact between the members as set forth. When the driving member is operated, the prongs 28 engage and move the rollers against the contact members 21 and thereby rotates the member C and the shaft B.

During this rotation, the rollers are not wedged but when this rotation stops and the shaft and driven member tend to rotate, the rollers of the companion pair of rollers wedge themselves sufficiently tight to lock the member C and the shaft B against reversing. In this wedging, each roller does not necessarily contact its flat face and the casing but may contact one or the other, but it will contact its companion roller sidewise and this contacting causes or tends to cause rotation of the rollers in opposite directions whereby considerable friction is produced to prevent rotation of the rollers.

Single rollers have been used in prior devices for locking purposes but that structure has been found impractical due to wearing of grooves in the seats for the rollers and consequent ineffectiveness of the locking after a short use of such a device.

In the present invention, I use two rollers to decrease the possibility of wearing grooves and to arrest rotation of the rollers while the same are moved into locking position.

In prior devices using rollers, the driving is done through the roller directly contacting the rotatable or driven member C frictionally. In the present invention, some of the rollers contact the contact member squarely and positively and directly which, in turn, rotates the driven member thus eliminating frictional driving contact of the rollers on the driven member.

If the driving member is rotated clockwise, as viewed in Fig. 1, the prongs 28 contact the rollers 25 which, in turn, contact the rollers 23 and the rollers 23 contact the contact members 21 which are inserted into the slots 14, 15 and 16 and extend above or outside of the periphery of the driven member. The members 21 exert pressure brought thereon by the rollers at 30; the point 30 is of less distance from the axis of the device than the contact point of the roller 23 on the contact member so that additional leverage is attained thereby to decrease the effort required to effect the locking and unlocking. Therefore, less power is required for locking and the possibility of wearing grooves due to locking is materially decreased.

The springs 22, when used, are inserted into the holes 31 and cushion the impact of the rollers on the contact member and thereby further reduce the possibility of wearing grooves.

In operations, when there is a comparatively heavy load on the shaft, as for instance in a jig for heavy work or for handling a large number of pieces of work, in which the clamping plate which must be moved is rather heavy and requires some power for its manipulation in addition to the power required for clamping the work, I prefer to omit the springs 22 but reduce the clearance to about 0.006" or less at 32 in the slots.

The structure as shown and described operates either right or left handed and holds the shaft against reversing in any rotative position thereof irrespective as to how light or how heavy a load may be on the shaft when no action is brought onto the device through the operating handle.

Upon operation of the handle, the prongs 28 first release the locking and then rotate the driven member and the shaft for useful work.

It is quite obvious that the rollers 25 and 26 can be omitted and still get good results even if the feature of the contacting rollers rotating in opposite directions is eliminated thereby since the contact of the rollers 23 and 24 on the contact members 21, as explained above, still has advantages over prior devices of the same nature as is explained above.

Omission of the rollers 23 and 25 results in a device which can drive the driven member and the shaft in either direction similar to a device having the rollers 23, 24, 25, and 26 but such a device can lock only in one direction namely in a clockwise direction.

Omission of the rollers 24 and 26 results in a device similar to the one described in the just preceding paragraph except that it can lock only in an anti-clockwise direction.

It appears to be quite obvious that the structure shown and described above is very well adapted for combination drive and drive in only one direction by merely leaving out the rollers on one side of the contact member according to the direction of rotation desired but the locking is effected in either case in the same manner namely by pushing the rollers along the flat faces and thereby wedging them between the respective flat faces and the bore of the casing when a certain resistance to rotation of the shaft is brought upon the shaft.

The amount or degree of this wedging can be carried to any degree by movement of the driving member and is released by movement of the driving member upon rotation thereof in the opposite direction.

Even if the amount or degree of this wedging is very small or light, the shaft can not rotate reversely by pressure brought thereon since the rollers contact the flat faces which are inclined to the bore and also contact the bore and each other when double rollers are used and any tendency of the shaft to rotate reversely results in more tightly wedging the rollers and consequent tighter locking.

I am aware that changes and modifications can be made in the structure and arrangement of parts shown and described; therefore, without limiting myself to the precise structure and arrangement of parts as shown and described,

I claim:

1. In a shaft rotating means, a casing, a rotatable shaft extending into said casing, a driven member carried by said shaft, a contact member loosely carried by said driven member and moving therewith, a motion transmitting member at each side of said contact member and between said casing and said driven member, and a rotatively movable driving member having a part to positively transmit motion of said driving member to said motion transmitting members and to said contact member to rotate said driven member and said shaft positively upon rotation of said driving member.

2. In a shaft rotating means, a rotatable shaft having a driven member forming part thereof, a casing over said driven member, a contact member loosely inserted into said driven member, a pair of sidewise adjacent companion members at each side of said contact member and between said casing and said driven member, and a rotatable driving member having a part to positively transmit motion of said driving member to said companion members and to said contact member and thereby positively rotate said driven member and said shaft thereon upon rotation of said driving member.

3. In a shaft rotating and locking means, a rotatable shaft, a driven member carried by said shaft to rotate therewith, a casing inclosing said driven member, a contact member inserted into said driven member, extending radially therefrom and having slight play therein, a flat face in the periphery of said driven member, inclined to the circular wall of said casing and immediately adjacent to said contact member, a second flat face in the periphery of said driven member, adjacent to the firstly mentioned flat face, and also inclined to the circular wall of said casing, a motion transmitting member on each of said flat faces, and a driving member having a prong to contact the motion transmitting member on the secondly mentioned flat face to move the same into contact on said motion transmitting member on the firstly mentioned flat face and to move the latter into contact on said contact member for rotation of said driven member and said shaft, and both of said motion transmitting members adapted to automatically move into less deep space between said driven member and said casing for locking said shaft against reversing upon an impulse of reverse rotation of said shaft.

4. In a shaft rotating and locking means, a casing having a bore therein, a rotatable shaft extending into said bore, a driven member secured to said shaft to rotate therewith, a contact member loosely inserted into said driven member and extending radially therefrom, flat faces sidewise of said radially extending part and inclined to said bore, a motion transmitting member on each of said flat faces inwardly of said bore, and a driving member to move said motion transmitting members against said contact member to move the latter and rotate said driven member and said shaft upon movement of said driving member and to let said motion transmitting members move upon said flat faces to lock said shaft against reversing upon an impulse of said shaft to reverse.

5. In a shaft rotating and locking means, a casing having a bore therein, a rotatable shaft extending into said bore, a driven member secured to said shaft to rotate therewith, a contact member inserted into said driven member and having slight play therein, extending radially therefrom, faces on the periphery of said driven member adjacent to a side of said contact member, the planes of said faces being different and each face inclined to the wall of said bore, a motion transmitting member between each of said faces and the wall of said bore, a driving member to move said motion transmitting members against said contact member for rotation of said shaft, and said motion transmitting members automatically moving into a wedging position for locking said shaft against reversing upon an impulse thereof to reverse.

6. In a shaft rotating and locking means, a casing having a bore therein, a rotatable shaft extending into said bore, a driven member secured to said shaft to rotate therewith, a contact member loosely inserted into said driven member and extending radially therefrom, a pair of flat faces on the periphery of said driven member, one at each side of said contact member, said faces being in different planes and each inclined relative to said bore, an individually rotatable roller between each of said faces and said bore, means for moving said rollers for rotating said shaft, and said rollers automatically moving into a locking position upon an impulse of said shaft to reverse.

7. In a shaft rotating means, a casing having a bore therein, a rotatable shaft extending into said bore, a contact member loosely inserted into said shaft, a pair of individually rotatable rollers, individually movable sidewise and mutually contactable between said shaft and said bore, one of said rollers adapted for driving contact on said contact member, and a selectively operable driving member to, upon operation thereof, contact the other one of said rollers to move the same sidewise into contact on said one roller and move the latter into contact on said contact member to rotate said shaft relative to said casing.

8. In an easily releasable shaft locking means, a casing having a bore therein, a rotatable shaft extending into said bore, a contact member loosely inserted into said shaft, a pair of individually rotatable rollers, individually movable sidewise and mutually contactable between said shaft and said bore to contact said contact member and move said shaft rotatively relative to said casing, and said rollers adapted to wedge between themselves and against said casing and against said shaft to lock said shaft against reversing relative to said casing upon an impulse of said shaft to reverse.

9. In a shaft rotating and easily releasable locking means, a casing having a bore therein, a rotatable shaft extending into said bore, a contact member loosely inserted into said shaft, a pair of individually rotatable rollers, individually movable sidewise and mutually contactable between said shaft and said bore, one of said rollers adapted for driving contact on said contact member, a selectively operable driving member to, upon operation thereof respectively contact and release the other one of said rollers to move the same sidewise in contact on said one roller and move the latter into contact on said contact member to rotate said shaft, and said rollers adapted to wedge between themselves and against said casing and against said shaft to lock said shaft against reversing upon an impulse of said shaft to reverse.

10. In a shaft rotating and easily releasable locking means, a casing having a bore therein, a rotatable shaft extending into said bore, a contact member extending radially from said shaft and having slight movement relative thereto, a plurality of sidewise spaced rollers on each side of said contact member, between said shaft and said bore, said rollers being paired and the rollers of each pair being contactable on each other and on said casing and on said shaft, each of said rollers being individually movable sidewise and individually rotatable, a selectively operable driving member to contact some of said rollers on each other and one of them onto said contact member to rotate said shaft upon operation of the driving member and respective ones of said rollers adapted to wedge themselves against each other and against said casing and against said shaft to lock said shaft against reversing when said driving member is not operating.

11. In a shaft rotating and easily removable locking means, a casing having a bore therein, a rotatable shaft extending into said bore, a contact member loosely inserted into said shaft, means, including paired self wedging rollers to normally retain said shaft against rotation, and a driving means to release the wedging of one of the pairs of rollers and move one of the rollers of this pair against said contact member to rotate said shaft upon operation of the driving means.

GUY E. SWARTZ.